Oct. 15, 1963

A. L. POOLE 3,107,343

INFORMATION RETRIEVAL SYSTEM

Filed Nov. 27, 1959

INVENTOR.
ARNOLD L. POOLE

BY Andrew Taras

AGENT

United States Patent Office
3,107,343
Patented Oct. 15, 1963

3,107,343

INFORMATION RETRIEVAL SYSTEM

Arnold L. Poole, Endicott, N.Y., assignor to International Business Machines Corporation, New York, N.Y., a corporation of New York Filed Nov. 27, 1959, Ser. No. 855,847
1 Claim. (Cl. 340—172.5)

The invention relates to information retrieval systems and, more particularly, to a system for locating a record within a tape containing a plurality of records.

The prior art is replete with a variety of information searching systems having the capabilities of scanning large volumes of magnetically recorded data. The systems, in one form or another, are either too costly or too slow in operation. In certain other systems, the address of an item of information to be retrieved has no relevancy with the record or records; while, in others, the address may be arbitrarily assigned and attached to the data itself. These limitations necessarily dictate the use of controls and complexities that make over-all tape searching unduly long and costly.

The present invention avoids the above limitations by employing a novel system which retrieves a record of information on the basis of finding a designated control word, or item, regardless of the position of the control word, or item, in the record.

Briefly, the searching system constituting the present invention employs a computer memory with a portion thereof allocated to receive the maximum-sized record.

The information on tape may contain a plurality of records each containing a variety of items, or control words, descriptive of the record. Each item, or word is constituted of a number of characters or digits. The retrieval of a particular record is achieved upon the finding of a designated item, or control word in that record.

As a preliminary to the searching operation, an image of the designated item, or control word, is placed in a search argument register, which image hereinafter is referred to as the search argument. A value corresponding to the location of the designated item, or control word, in the tape record is entered into a control word position register. Counting means cooperating with the control word position register determine, in accordance with the location value in the control word position register, when a comparison should be made between the designated item, or control word, and the search argument. The tape record information is processed through a tape reader of the type well known in the art, and fed into a selected portion of a computer memory. The selected portion of the memory is adapted to receive all of the items, or control words, comprising each record entered from the tape. For example, if the number of items, or control words, in each record on the tape is, say, eight, the number of word locations in memory allocated for the reception of these eight words is also eight. The entry of the first eight words of the first tape record will be effected sequentially into these eight memory locations, after which the next record, record 2, is entered into the same eight memory locations and thereby automatically erasing the eight previously entered records constituting record 1. In this manner, the entry of a record into memory causes the previously entered record to be automatically erased. While the entry of the tape information progresses in this manner, counting means in cooperation with the control word position register control the time in each record entry operation, depending upon the location value contained in the control word position register, when a comparison is thereby effected between a designated item, or control word, of each record and the search argument. As each record is entered into memory, a comparison, or test, is made and, when during the course of such an entry a designated item is not found, evidenced by a noncomparison, the next succeeding record will be read into the memory into the same word locations occupied by the eight words of the previously entered record. The entry of the records into memory, in the manner described, is under control of a ring and addressing means well known in the art.

When, during the course of a comparing operation, an equal condition is encountered between the designated item and the search argument, it is an indication that the sought after record has been found. The equal condition in conjunction with the ring controls will terminate entry of the current record into the memory upon the entry of the last item, or control word, of the current record. The current record in the memory at this point is the retrieved record. It may thus be appreciated that the degree of efficiency of the present invention is at a maximum whenever the location of the designated item, or control word, to be searched for happens to be near the end, or at the end, of the records. The retrieval of the sought after record under this situation occurs substantially simultaneously with the finding of the designated item, or control word in the searching operation.

The principal object of the invention resides in the provision of a novel searching system for retrieving record information on the basis of a searching control word and effecting the retrieving and searching operations on a concurrent basis.

Another object resides in the provision of a searching system for retrieving information in a faster and a more expeditious manner than has heretofore been possible by prior art searching systems.

Still another object resides in the provision of a novel searching system which avoids the limitations and complexities in the prior art systems.

A specific object resides in the provision of a control for selectively entering arguments and their record locations under program control during the course of a record search.

The foregoing and other objects, features and advantages of the invention will be apparent from the following more particular description of a preferred embodiment of the invention, as illustrated in the accompanying drawings.

Figure 2:
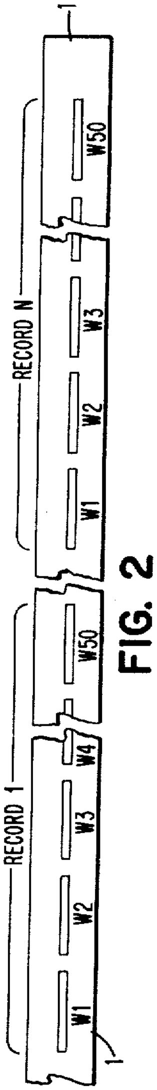
FIG. 2 is a detail portion of an information bearing record tape.

Although not limited to any specific type of record-bearing medium or to the type of code that may be employed, the invention is best illustrated in connection with the magnetic tapes on which items of information, constituting a record, are magnetically recorded in coded form. A portion of an exemplary tape is shown in FIG. 2, wherein items of information, referenced W1, W2, W3, etc., constitute a record, which oftentimes is also referred to as a block of information. The tape shows Record 1 and Record N. Each item in each record is often referred to as a word, each word being made up of a fixed number of characters (or digits), for example, 10 characters, and each character being constituted of a fixed number of bits according to the code in use. Conventional codes, of which there are a variety, are generally in binary notation, binary coded decimal, 2 out of 5, and so forth. For validity checking purposes, a redundant bit is inserted in the character to provide for an odd bit count or an even bit count, depending upon which is desired.

Figure 1:
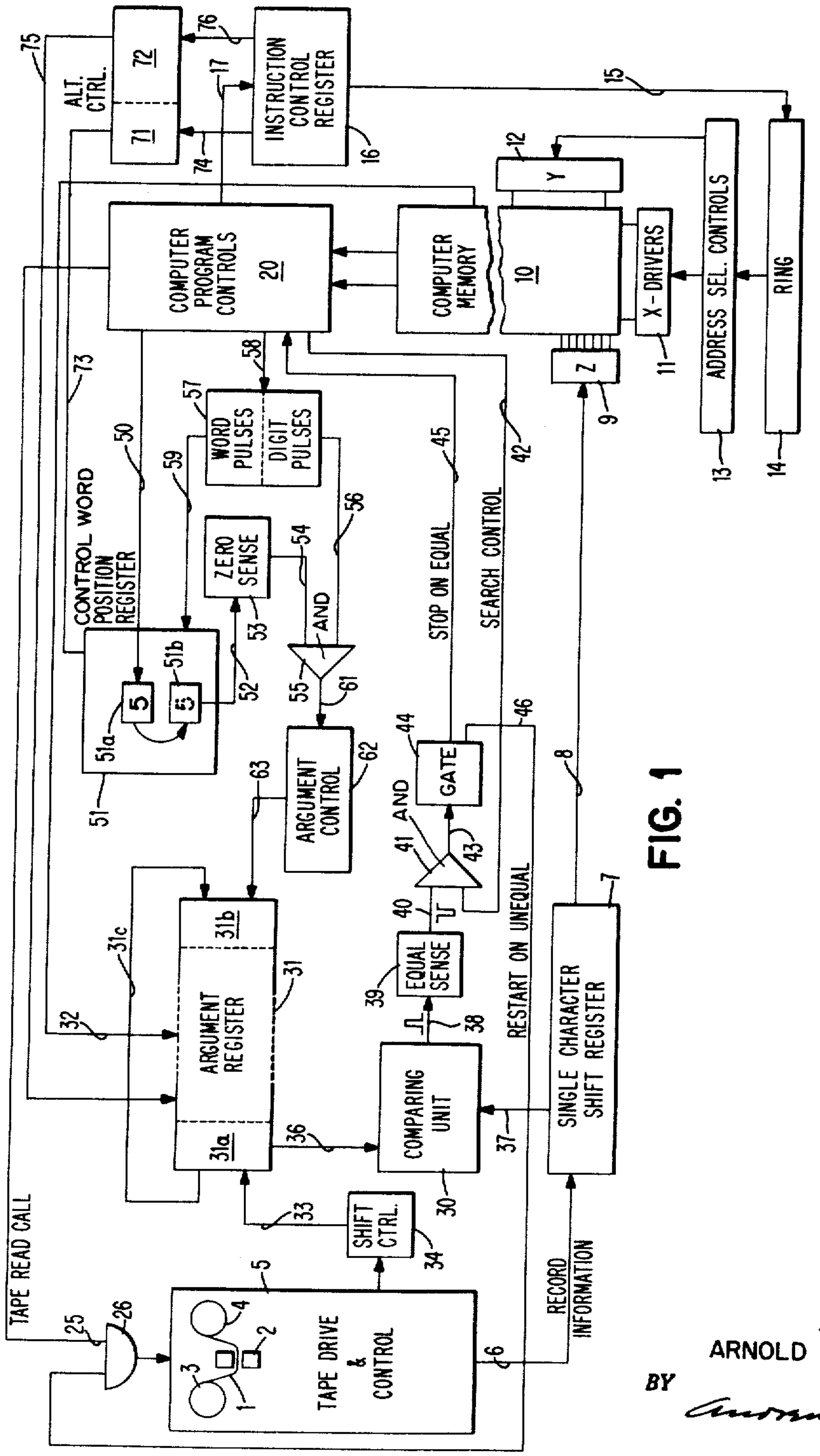
FIG. 1 is a diagram of the arrangement for practicing the invention.

Referring to FIG. 1, the recorded items or words of tape information are shown diagrammatically recorded on a tape in the form of small rectangular blocks, referenced *w*1, *w*2, *w*3, *w*4, etc., to *w*50, each representing a word of information. Each group of words constitutes a record; for example, Record 1 and Record N. As may be appreciated from FIG. 2, the spacing between records, referred to as a record gap, is larger than the spacing, referred to as word gap, between the words within each record. The character (or digit) gap, although not shown, within each word, is yet smaller than the word gap. The tape 1 is processed through a tape drive and control unit 5 of a well-known type; for example, IBM Type 729. This tape drive and control unit 5 includes circuit means of the type disclosed in Patent No. 2,739,238, issued March 20, 1956, to J. E. Bartelt, entitled "End of Record Detector." By virtue of these means, appropriate circuits are employed in the computer program controls 20 to distinguish among character (or digit) gaps, word gaps, and end-of-record gaps. The tape unit 5 contains a tape supply reel 3, a take-up reel 4, and a read/write station 2, through which the tape is passed and read. The record information read from the tape is transmitted along an output channel 6 into a single character shift register means 7 of the type disclosed in Patent No. 2,842,682, issued July 8, 1958, to Genung L. Clapper, entitled "Reversible Shift Register," and assigned to the common assignee. This information passes through the latter and by way of information channel 8 into a computer memory 10 by way of information line drivers 9. The memory 10 may be of the type disclosed in the Patent No. 2,784,391, issued to J. Rajchman et al. on March 5, 1957, for a Memory System. This memory system has the capability of storing data words into selectively addressable locations thereof. The channel 8 may be switched directly to the channel 6 by control means, not shown, in order that information may be entered in the memory at the same time that it enters the register.

The memory 10 utilizes bistable elements, each one capable of registering the presence or absence of a character bit of information. One example of such a storage element is, of course, the magnetic core which possesses two conditions of stability. For the sake of convenience, the memory is assumed to be constituted of magnetic cores. The selection of each core to store a character bit of information is under control of X-drivers 11 and Y-drivers 12, which drivers, in turn, being controlled by an address selection control unit 13 of the type shown and described in the afore-mentioned Rajchman Patent No. 2,784,391. The latter is controlled by means of a ring 14 of the type shown and described in Patent No. 2,884,191, issued April 28, 1952, to C. F. Weiss, Jr., et al., entitled "Electronic Commutator," is connected to a control line 15, in turn connected from an instruction control register 16. The instruction control register 16 may be of the type shown and described in the Patent No. 2,636,672, issued April 28, 1953, to F. E. Hamilton et al., entitled "Selective Sequence Electronic Calculator." This register 16 in turn receives instruction commands by way of a channel line 17 connected to the computer program control section 20 of the system. By means of the foregoing controls, each word of record information passing from the tape unit 5 by way of the channel 6, register 7, channel 8, is entered into selected word locations in the memory. Each corresponding word of each succeeding record is addressed to the same word location in the memory. It is conceivable that different records may, of course, be of variable lengths; in which situation the address selection controls 13, in connection with the ring 14, will affect the necessary controls to insure that corresponding words will be addressed to the same memory location.

The initiation of a search operation is effected in conventional manner; that is, by means of an appropriate program instruction, which instruction is read from a program routine. This program instruction initiates a call for a tape reading operation by generating a signal that is fed from the computer program control section 20, which program control may be of the type shown and described in the afore-mentioned Patent No. 2,636,672, over a channel line 25, through an OR device 26 into the tape unit 5.

As indicated earlier, the retrieval of a tape record is predicated upon the finding of a particular control word in the record during the course of transmission of the latter to memory. The operation for finding this particular word of the record is carried out mainly by means of a comparing unit 30, argument register 31 and the single character shift register 7. The comparing unit 30 may be of the type shown and described in the Patent No. 2,785,856, issued to Linder C. Hobbs on March 19, 1957, entitled "Comparator System for Two Variable Length Items." The argument register 31 is a shift-type register having a word capacity of 10 character positions, positions 31*a* and 31*b* representing, respectively, the high and low order positions of the register. This register 31 may be of the type shown and described in the Patent No. 2,700,502, issued January 25, 1955, to F. E. Hamilton et al., entitled "Multidigit Shifting Means." The register 31 has also a regenerative path 31*c* for recirculating the argument through the register 31. The shifting operation of the register 31 is under control of signals directed through the shift line 33, connected to a shift control means 34 which may be of the type shown and described in the afore-mentioned Hamilton et al. Patent No. 2,700,502, is connected to the tape drive and control unit 5. The shift control unit 34 coordinates the shifting and regeneration of the argument information with the record information passing through the single character shift register 7. The comparing unit 30 is a well-known comparing means employing any suitable electronic means for comparing the argument information fed from the argument register 31 through line 36 with the record control information fed from the single character shift register 7 through line 37. The output from the comparing unit 30 will either be an equal signal or an unequal signal depending upon the comparing decision. In the event the decision yields an equal signal, searching operations will be terminated upon the entry of the record into the memory. An unequal signal, on the other hand, provides a control signal which causes the tape reading operations to continue. The means for accomplishing these two functions will now be explained.

Referring to the comparing unit 30, the output of the latter is passed through a channel line 38 to an equal sensing means 39, which is primarily a signal inverter. The output from the latter is fed through a line 40 connected to an AND circuit 41. This AND circuit has a gate line 42 connected thereto and provides an On signal at all times that a searching operation is in effect. The output of the AND circuit 41 passes through a line 43 connected to a gate 44 having output lines 45 and 46 for supplying, respectively, a stop-on-equal signal and a restart-on-unequal signal. The former signal is gated with an end-of-record signal, not shown, in the computer program control unit 20 to stop the search at the end of the record in which the equal signal occurred. The restart-on-unequal signal impressed on the line 46 passes through the OR circuit 26 to the tape unit 5 to cause the latter to continue tape feeding and tape reading operations.

The operation for entering the argument information into the register 31 is under program control and the argument word itself is transmitted from the memory 10 to the register 31 by way of line 32. The number, corresponding to the position of the control word in the record, is also entered into the computer memory 10, in the form of a location number instruction, as a preliminary step to the search operation. This location number instruction is fed from the memory 10 through the computer program control section 20, through line 50, to the control word position register 51. The register 51 comprises essentially a pair of subregisters 51*a* and 51*b* which may be of the type shown in the Patent No. 2,848,166, issued August 12, 1958, to G. E. Wagner, entitled "Counter," to control the activities of the searching operation. The location number of the location number instruction is initially fed by way of the line 50 to the subregister 51*a*, wherein it is retained therein throughout a particular searching operation unless it is altered under control of a special altering program instruction, as may be the case when it is required to alter the position number to accommodate a new control word. An image of the location value in the subregister 51*a* is transferred to the subregister 51*b*, wherein it will be decremented by the count-down means shown and described in said afore-mentioned Patent No. 2,848,166 once for each record word read into the memory under control of word gate signals impressed on line 59. This decrementing continues until the count of the image number is reduced to zero, whereupon an argument control means 62 becomes effective to cause the argument to be transmitted from the argument register and compared with the control word, the comparison being effected in the comparing unit 30. Said argument control means 62 is essentially a shifting control means of the type shown and described in Patent No. 2,782,305, issued February 19, 1957, to B. L. Havens et al., entitled "Digital Information Register."

When the count in the subregister reaches zero, a signal is transmitted along the register output line 52 and gated through a zero sense gating means 53. The output of the latter passes to an AND circuit 55, by way of a line 54, wherein the zero signal is gated with digit pulses to pass through line 61 to an argument control unit 62. The word and digit pulses for the above are derived from pulse generators located in timing unit 57 controlled by the computer program control 20, by way of a line 58. This timing unit 57 provides, among other controls, the necessary timing controls to initiate the count-down operations of register 51*b*, the sensing of the zero condition in said register 51*b* when the count-down reaches zero, which denotes the time in the retrieval operation that a comparison is to be initiated between the search argument and the designated tape item.

While the invention has been particularly shown and described with reference to a preferred embodiment thereof, it will be understood by those skilled in the art that the foregoing and other changes in form and details may be made therein without departing from the spirit and scope of the invention.

What is claimed is:

An information retrieval system in which the retrieval of a record from a file is effected concurrently with the finding of a control word in the record further constituted of a plurality of item words comprising:

an information channel over which said records are transmitted;

an information register connected to said channel and through which said records are fed;

a memory unit connected to said register for receiving the records, said memory including addressing means for entering corresponding words of the records into the same memory locations and the entry of each record effacing the previously entered record;

an argument register into which a search argument is stored as an incident to the retrieval operation;

a control word position register into which a location value, indicative of the position of the control word in the record, is stored as an incident to the retrieval operation;

a comparing unit connected between said information register and said argument register for comparing the search argument with the control word; a word counter connected to said control word position register and controlled by the latter to initiate counting of the words of each record transmitted to said memory;

count control means connected to said argument register to render the latter operable to effect a comparison by said comparing unit at a time determined by the location value in said word position register so that only the control word of the entire record is compared with said argument during the transmission of said control word into said memory; and means responsive to an end-of-record signal for terminating the retrieval operation at the end of transmission into said memory of the record yielding the equal comparison.

References Cited in the file of this patent

UNITED STATES PATENTS

| | | |
|---|---|---|
| 2,783,454 | North | Feb. 26, 1957 |
| 2,785,388 | McWhirter et al. | Mar. 12, 1957 |
| 2,885,659 | Speilberg | May 5, 1959 |
| 2,900,132 | Burns et al. | Aug. 18, 1959 |
| 3,017,610 | Auerbach et al. | Jan. 16, 1962 |